US009106956B2

(12) United States Patent
Chun et al.

(10) Patent No.: US 9,106,956 B2
(45) Date of Patent: Aug. 11, 2015

(54) METHOD FOR DISPLAYING PROGRAM INFORMATION AND IMAGE DISPLAY APPARATUS THEREOF

(75) Inventors: Seungsik Chun, Seoul (KR); Kyungjin Lee, Seoul (KR); Hyunseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 13/398,464

(22) Filed: Feb. 16, 2012

(65) Prior Publication Data

US 2012/0331505 A1  Dec. 27, 2012

(30) Foreign Application Priority Data

Jun. 23, 2011 (KR) .................. 10-2011-0061383

(51) Int. Cl.
*H04N 21/482* (2011.01)
*H04N 21/431* (2011.01)
*H04N 21/45* (2011.01)
*H04N 21/462* (2011.01)
*H04N 21/466* (2011.01)

(52) U.S. Cl.
CPC ......... *H04N 21/462* (2013.01); *H04N 21/4312* (2013.01); *H04N 21/4532* (2013.01); *H04N 21/4667* (2013.01); *H04N 21/482* (2013.01)

(58) Field of Classification Search
CPC .......... H04N 21/44222; H04N 21/482; H04N 21/4667; H04N 21/462; H04N 21/4312; H04N 21/4532
USPC .......................................... 725/37–61, 9, 11
See application file for complete search history.

(56) References Cited

U.S. PATENT DOCUMENTS

| | | | |
|---|---|---|---|
| 6,005,601 A * | 12/1999 | Ohkura et al. | 725/52 |
| 6,637,029 B1 * | 10/2003 | Maissel et al. | 725/46 |
| 6,934,917 B2 * | 8/2005 | Lin | 715/811 |
| 7,689,933 B1 | 3/2010 | Parsons | |
| 7,831,987 B2 * | 11/2010 | Shikata et al. | 725/41 |
| 2003/0088870 A1 * | 5/2003 | Wang | 725/44 |
| 2004/0255150 A1 | 12/2004 | Sezan et al. | |
| 2006/0074984 A1 * | 4/2006 | Milener et al. | 707/104.1 |
| 2007/0186267 A1 * | 8/2007 | Ohde et al. | 725/135 |
| 2008/0072255 A1 | 3/2008 | Kim et al. | |
| 2008/0092173 A1 | 4/2008 | Shannon et al. | |
| 2008/0235348 A1 * | 9/2008 | Dasgupta | 709/218 |
| 2009/0199241 A1 * | 8/2009 | Unger et al. | 725/41 |
| 2009/0222757 A1 * | 9/2009 | Gupta et al. | 715/776 |
| 2010/0031282 A1 | 2/2010 | Torimaru | |
| 2011/0179435 A1 * | 7/2011 | Cordray et al. | 725/9 |
| 2011/0202888 A1 * | 8/2011 | Rusu et al. | 715/855 |
| 2015/0074604 A1 * | 3/2015 | Seo et al. | 715/825 |

FOREIGN PATENT DOCUMENTS

KR    10-0787978 B1    12/2007

* cited by examiner

*Primary Examiner* — Hunter B Lonsberry
*Assistant Examiner* — Alexander Q Huerta
(74) *Attorney, Agent, or Firm* — Birch, Stewart, Kolasch & Birch, LLP

(57) ABSTRACT

A method and apparatus for displaying information are discussed. According to an embodiment, the method includes obtaining, by an image display apparatus, viewing history information on a plurality of programs or channels based on a previous viewing of the plurality of programs or channels; generating priority information for the programs or channels based on the obtained viewing history information; and visually indicating, on a display unit of the apparatus, a plurality items corresponding respectively to the plurality of programs or channels to be distinct from each other according to the generated priority information.

20 Claims, 13 Drawing Sheets

FIG. 8
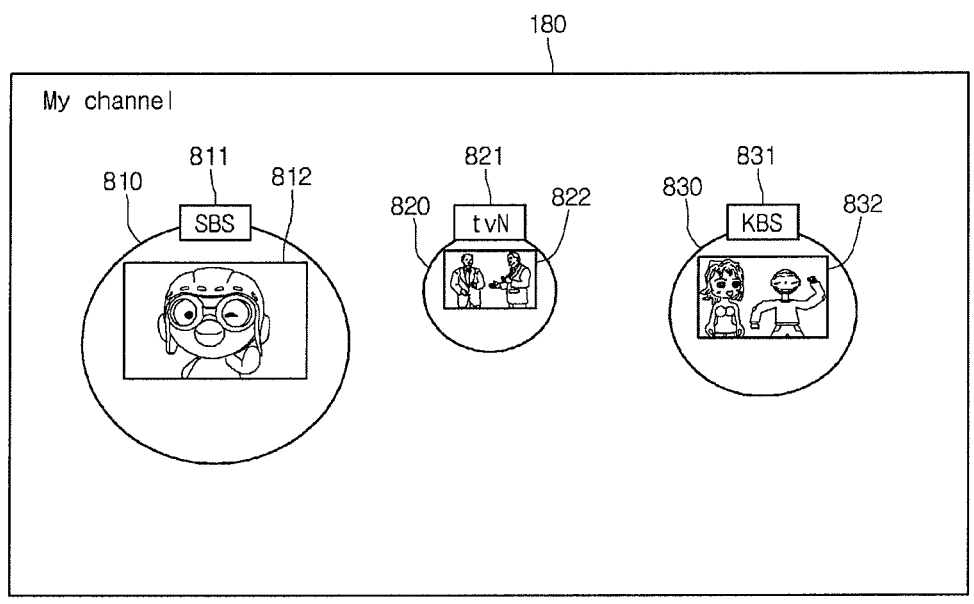
(a)
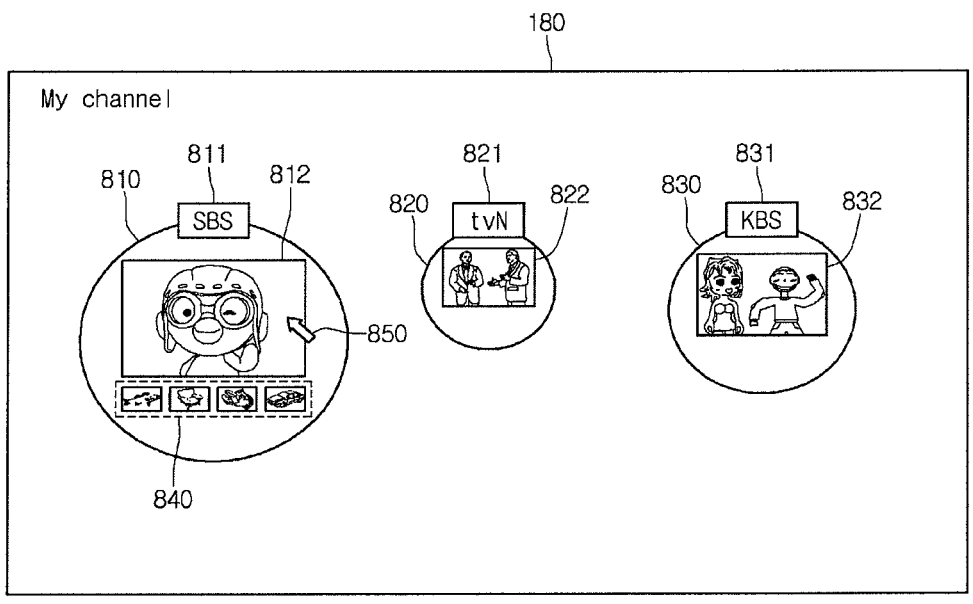
(b)

FIG. 9
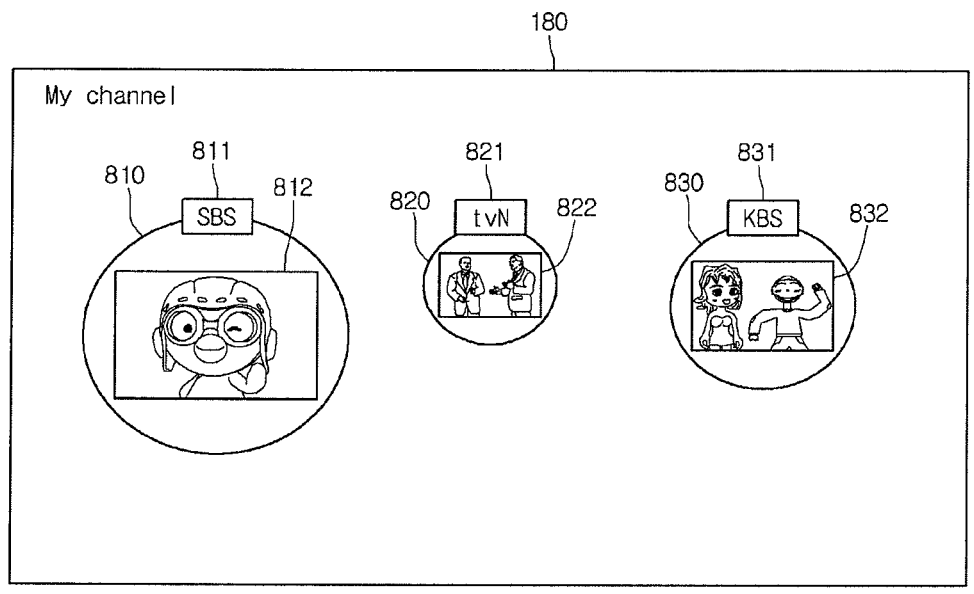
(a)
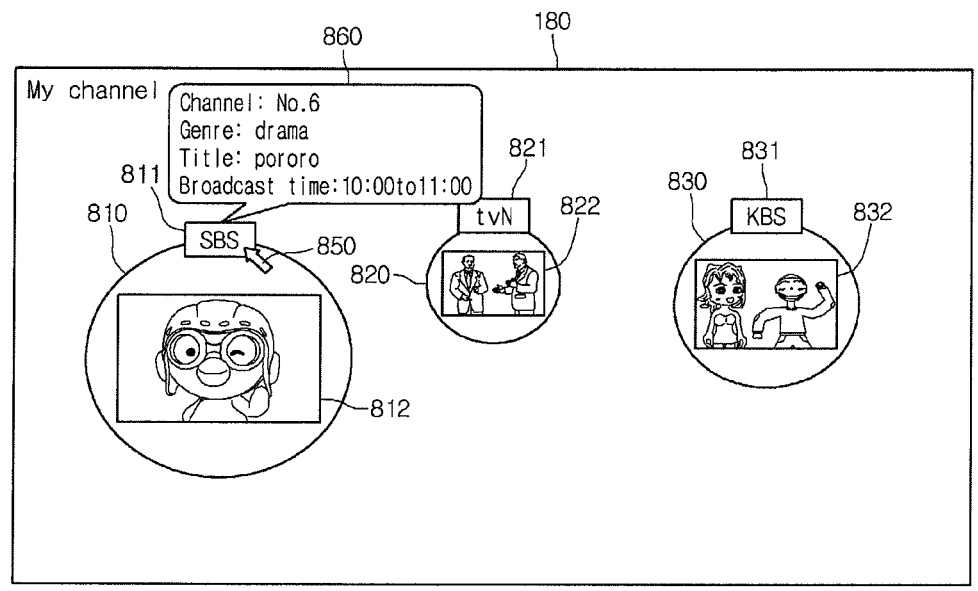
(b)

FIG. 13
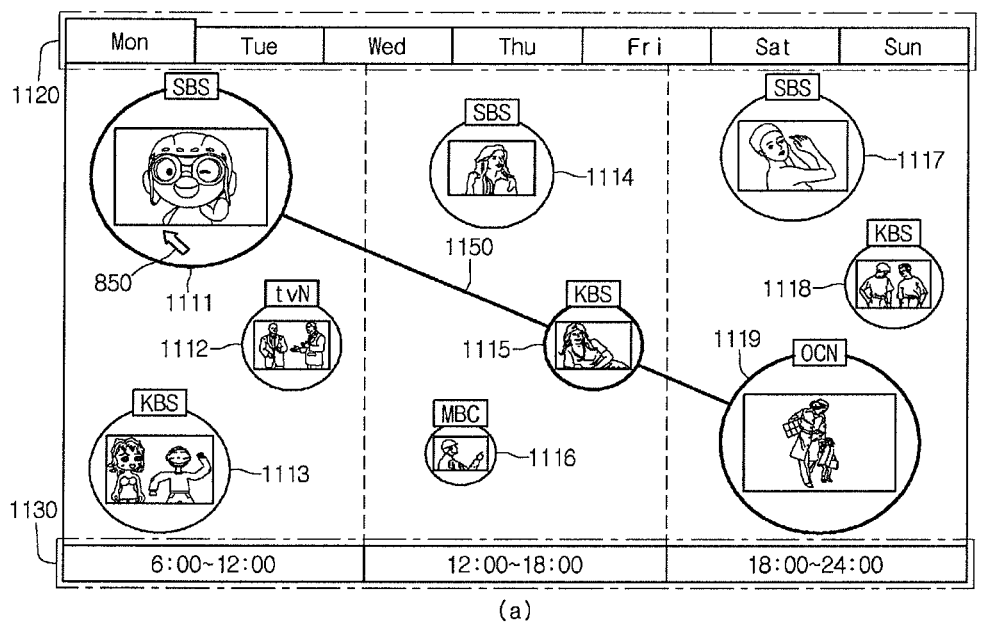
(a)
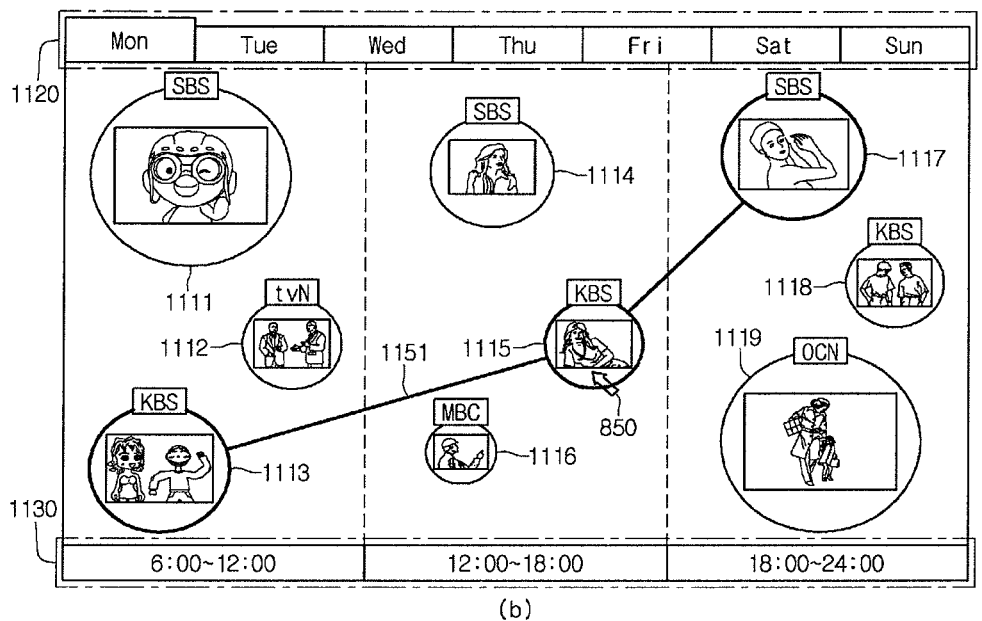
(b)

METHOD FOR DISPLAYING PROGRAM INFORMATION AND IMAGE DISPLAY APPARATUS THEREOF

CROSS REFERENCE TO RELATED APPLICATION

This application claims under 35 U.S.C. §119 the priority benefit of Korean Patent Application No. 10-2011-0061383, filed on Jun. 23, 2011, entitled "Method for displaying program information and image display apparatus thereof", which is hereby incorporated by reference in its entirety into this application.

BACKGROUND OF THE INVENTION

1. Technical Field

The present invention relates to a program information display method and in particular, to a method and apparatus for visualizing and displaying information about programs watched by a user 2. Description of the Related Art Recently, digital TV services using wired or wireless communication networks are more common. The digital TV services can provide various services which have not been provided in the existing analog broadcasting services.

For example, an Internet Protocol Television (IPTV) service that is one type of the digital TV services is a bidirectional service which allows a user to actively select the kind, viewing time, or the like of a program to be watched. The IPTV service can provide various additional services, such as the Internet search, home shopping, on-line games, or the like, based on the bidirectional service capability.

SUMMARY OF THE INVENTION

An object of the present invention is to provide a method for displaying program information and a display apparatus thereof, wherein information about a preference program may be analyzed for each individual, each day of the week, each genre, each time zone, and the like and the analyzed program information may be visualized and displayed.

Another object of the present invention is to provide a method and apparatus for displaying data associated with viewing history, which address the limitations and disadvantages associated with the related art.

In a method for displaying information of a plurality of preference programs on an image display apparatus, the program information display method according to an embodiment of the present invention includes obtaining viewing history information about a plurality of preference programs, generating priority information for each of the preference programs based on the obtained viewing history information, and visually indicating a plurality of items indicating each program information to be distinct from each other according to the generated priority information.

An image display apparatus according to another embodiment of the present invention includes a display unit, a control unit which obtains viewing history information about a plurality of preference programs, and generates priority information for each of the preference programs based on the obtained viewing history information, and a storage unit which stores the obtained viewing history information and the generated priority information, wherein the control unit controls such that a plurality of items indicating each program information is visually displayed on the display unit to be distinct from each other according to the generated priority information.

According to an embodiment of the present invention, information about a preference program may be analyzed for each individual, each day of the week, each genre, each time zone, and the like and the analyzed program information may be visualized and displayed, thereby facilitating the searching and the viewing of programs desired by the user, more intuitionally.

According to an embodiment, the present invention provides a method for displaying information on an image display apparatus including a display unit, comprising: obtaining, by the image display apparatus, viewing history information on a plurality of programs or channels based on a previous viewing of the plurality of programs or channels; generating priority information for the programs or channels based on the obtained viewing history information; and visually indicating, on the display unit, a plurality items corresponding respectively to the plurality of programs or channels to be distinct from each other according to the generated priority information.

According to an embodiment, the present invention provides an image display apparatus comprising: a display unit; and a control unit configured to control the display unit and to: obtain viewing history information on a plurality of programs or channels based on a previous viewing of the plurality of programs or channels; generate priority information for the programs or channels based on the obtained viewing history information; and visually indicate, on the display unit, a plurality items corresponding respectively to the plurality of programs or channels to be distinct from each other according to the generated priority information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 5 to 11 are diagrams showing a method for visualizing and displaying the program information of the image display apparatus according to the one embodiment of the present invention on a screen.

FIG. 13 shows diagrams showing an example of a method for visualizing and displaying the program information of the image display apparatus on a screen according to an embodiment of the present invention.

DESCRIPTION OF THE PREFERRED EMBODIMENTS

Hereinafter, a broadcast channel display method and an image display apparatus thereof according to embodiments of the present invention will be described in detail with reference to the accompanying drawings.

An 'image' in the present invention can include a video, a still picture, contents, data, etc., such as a still picture, a moving video/clip, texts, an icon, a menu, a symbol, a 3D image, a pop-up window, etc.

An image display apparatus according to an embodiment of the present invention, for example, as an intelligent image display apparatus having both of the broadcast reception function and the computer assisted function, may include a more convenient user-friendly interface than a handwriting input apparatus, a touch screen or space remote controller, and the like, by adding an internet function while having a broadcasting receiving function. In addition, the image display apparatus may also perform an E-mail function, a web browsing, Internet banking or games, and the like by connecting to an Internet and computer supporting a wired or wireless internet function. In order to perform various functions described above, a general purpose operation system (OS) may be used.

Therefore, in the image display apparatus described in the present invention, since various applications may be freely added or deleted on a general OS Kernel, various user-friendly functions may be performed. More specifically, the image display apparatus may be, for example, a network TV, a 3D TV, a HBBTV, a smart TV and the like, and may be applied in a smart phone in some cases. The image display apparatus may also be a computer, a laptop, a mobile terminal, a tablet, a multimedia device, a smart phone, etc.

Furthermore, embodiments of the present invention will be described in detail later with reference to the accompanying drawings, but the embodiments of the present invention are not restricted or limited.

The terms used herein are selected by general terms new widely used for the technological field taking into account functions in the present invention, but, those may be varied depending on the technician's intentions engaged in the art, practices or the advent of new technologies. In addition, terms randomly selected by the applicant are used in specific case, and in this case, its meaning will be described in the corresponding description of the invention Therefore, it is noticed that the terms used in the specification may be interpreted based on the real meanings of the terms and the contents throughout the specification.

Figure 1:
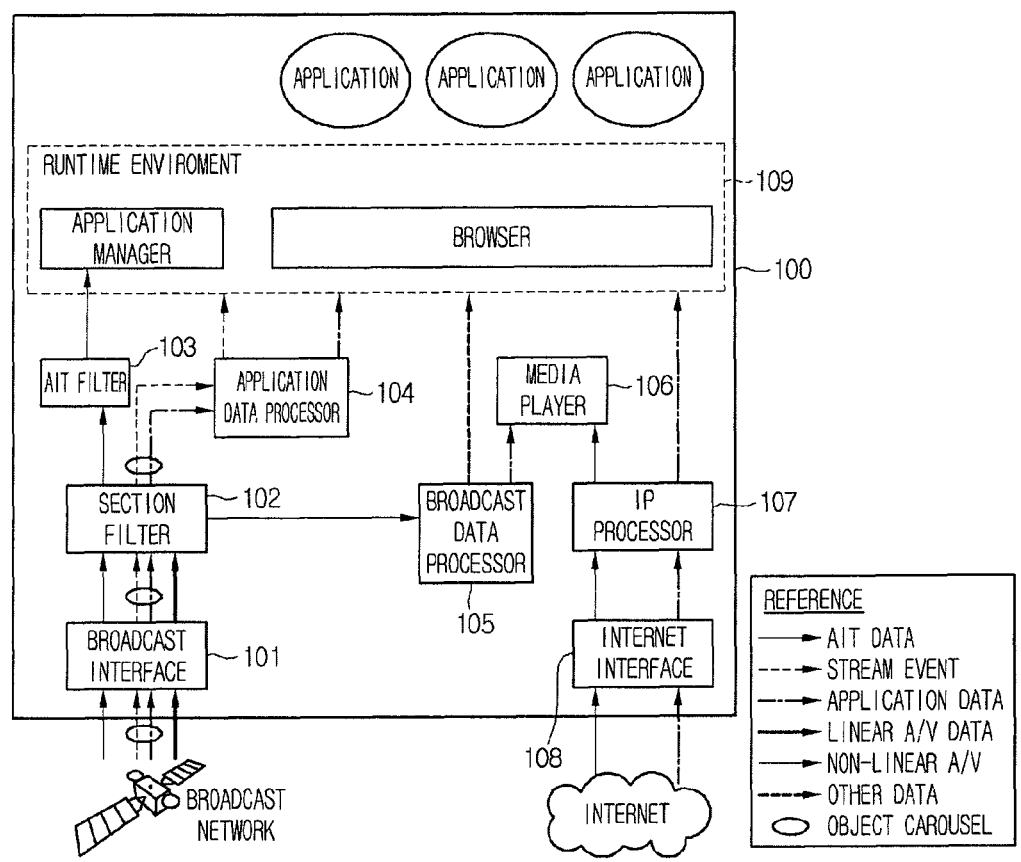
FIG. 1 is a diagram showing a first example of the configuration of a broadcast system including an image display apparatus according to an embodiment of the present invention.

FIG. 1 is a diagram showing a first example of the configuration of a broadcast system including an image display apparatus 100. The image display apparatus 100 corresponding to the client may connect to a broadcasting network and an Internet network.

Referring to FIG. 1, the image display apparatus 100 may include a broadcast interface 101 for communicating with a broadcast network, a section filter 102, an AIT filter 103, an application data processing unit (or processor) 104, a broadcast data processing unit (or processor) 105 for processing broadcast contents, a media player 106 for recording and/or reproducing images, an internet protocol processing unit (or processor) 107, an internet interface 108 for communicating with the Internet or other networks, and a run time module 109. The run time module 109 may include an application manager, a web browser, etc. The image display apparatus 100 includes a display unit which may be part of the media player 106 or may be a separate unit, and can display various images/contents including broadcast/TV contents, web-associated contents, etc. One or more processors of the image display apparatus 100 of FIG. 1 can operate as a control unit, or a separate controller may be provided to control the operations of the apparatus 100. The image display apparatus 100 may include other known components. All components of the image display apparatus 100 of FIG. 1 are operatively coupled and configured.

Figure 2:
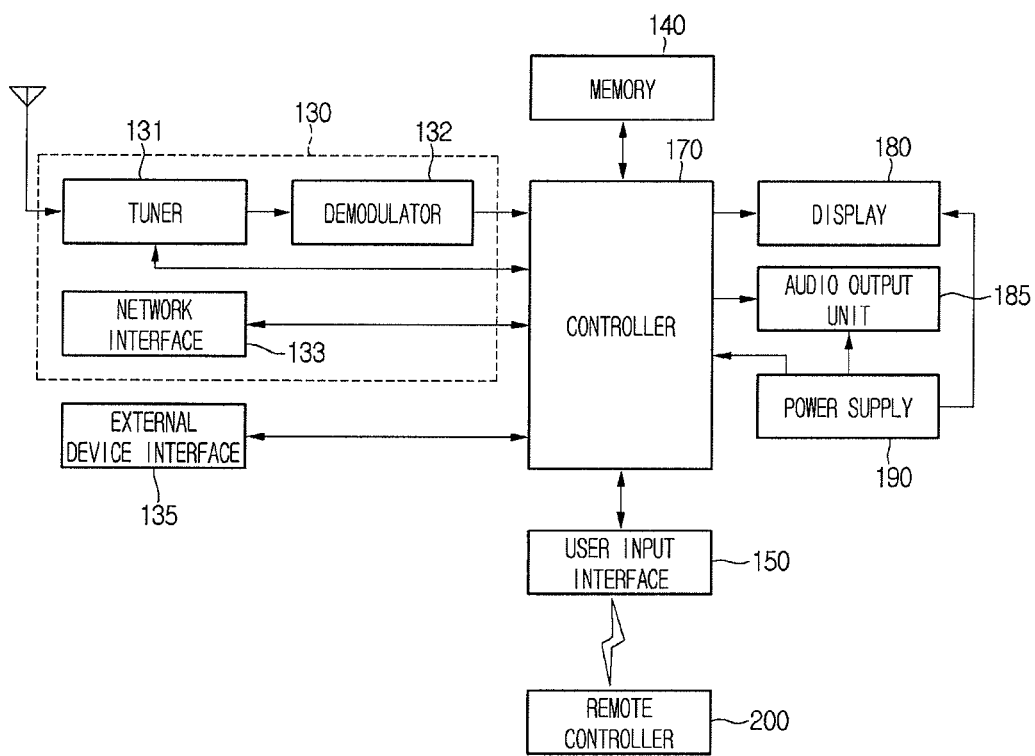
FIG. 2 is a block diagram showing a second example of the configuration of an image display apparatus according to an embodiment of the present invention.

FIG. 2 is a block diagram showing a second example of the configuration of an image display apparatus 100 according to an embodiment of the present invention.

Referring to FIG. 2, the image display apparatus 100 may include a broadcast receiving unit 130, an external device interface unit 135, a memory or storage unit 140, a user input interface unit 150, a control unit 170, a display unit 180, an audio output unit 185 and a power supply 190. Meanwhile, the broadcast receiving unit 130 may include a tuner 131, a demodulator 132 and a network interface unit 133. The image display apparatus 100 may include other known components. All components of the image display apparatus 100 of FIG. 2 are operatively coupled and configured.

The tuner 131 may select RF broadcasting signals corresponding to the selected channel by the user or all channels already stored among radio frequency (RF) broadcasting signals received via an antenna, and convert the selected RF broadcasting signals into intermediate frequency signals or baseband images or audio signals. For example, when the selected RF broadcast signal is a digital broadcast signal, the tuner 131 may convert the selected RF broadcast signal into a digital IF signal (DIF), and when the selected RF broadcast signal is an analog broadcast signal, the tuner 131 may convert the selected RF broadcast signal into an analog baseband image or an audio signal (CVBS/SIF).

The demodulator 132 may receive the converted digital IF signal DIF from the tuner 131 and perform the demodulation operation. For example, when digital IF signal output from the tuner 131 is ATSC system, the demodulator 132 may perform 8-vestigal side band (8-VSB) demodulation. Meanwhile, the demodulator 132 may separately include an ATSC demodulator and a DVB demodulator according to ATSC system or DVB system.

The stream signal output from the demodulator 132 may be input to the control unit 170. Further, the control unit 170 may output an image to the display unit 180 and output the audio to the audio output unit 185, respectively, after demultiplexing, the image and audio signal processing, and the like.

The external interface unit 135 may connect an external device and the image display apparatus 100. To this end, the external interface unit 135 may include an A/V input and output unit or wireless communication unit, and the like.

The external interface unit 135 may access the external devices such as a Digital Versatile Disk (DVD), a Blu ray, a game device, a camera, a camcorder, a computer (notebook), and the like through wired or wireless. In addition, the external interface unit 135 may transmit the image, voice or data signal input from the outside through the connected external device to the control unit 170 of the image display apparatus 100 and output the proceed image, voice or data signals in the control unit 170 to the connected external device.

Meanwhile, the external interface unit 135 may receive applications or application lists in adjacent the external devices and transmit the received applications or application lists to the control unit 170 or the storage unit 140.

The network interface unit 133 may provide an interface for connecting the image display apparatus 100 to a wired or wireless network including the Internet. For example, the network interface unit 133 may include an Ethernet terminal for connection to a wired network, and the like, and connect to the wireless network by using Wireless LAN (WLAN) (Wi-Fi), Wireless broadband (Wibro), World Interoperability for Microwave Access (Wimax), High Speed Downlink Packet Access (HSDPA) communication standards, and the like.

Meanwhile, the network interface unit 133 may transmit or receive data to and from another user or another electronic device through a connected network or another network linked to the connected network.

The network interface unit 133 may access a predetermined Web page through a connected network/server or another network linked in the connected network. For instance, by connecting to the predetermined Web page through the network, data may be transmitted or received to or from the corresponding server. The network interface unit 133 may select and receive desired applications of opened applications in the air through the network.

The storage unit 140 may store programs for processing and controlling each of the signals in the control unit 170 and store the processed video, audio and data signals.

Further, the storage unit 140 may temporarily serve to store video, audio or data signals input from the external interface unit 135 or the network interface unit 133 and store information associated with the predetermined broadcast cannel through the channel memory function. The storage unit 140 may include, for example, at least one type of storage medium such as a flash memory type, a hard disk type, a multimedia card micro type, a card type (for example, SD or XD memories, and the like), a RAM, a ROM (EEPROM, and the like)

The user input interface unit 150 may transmit input signals input by the user to the control unit 170 or, transmit the signals from the control unit 170 to the user. For example, the user input interface unit 150 may process to receive control signals such as power on/off, channel selection, screen setting, and the like from the remote control device 200 according to various communication standard of the radio frequency (RF) communication standard or the infrared (IR) communication standard, and the like, or process to transmit control signals from the control unit 170 to the remote control device 200.

In addition, the user input interface unit 150 may transmit the control signals input from a local key (such as a power key, a channel key, a volume key, a setting key, and the like to the control unit 170. The user input interface unit 150 may communicate with another input unit such as a keyboard, a touchpad, a keypad, etc.

The control unit 170 may de-multiplex streams input from the tuner 131 or the demodulator 132 or the external interface unit 135, or process the de-multiplexed signals, and produce and output the signals for image or voice output.

The processed image signals in the control unit 170 may input the display unit 180, and display an image corresponding to the image signal. Further, the processed image signals from the control unit 170 may be input to the external output device through the external interface unit 135.

Further, the processed voice signal from the control unit 170 may be output to the audio output unit 185. Further, the processed voice signal from the control unit 170 may be input to the external output device through the external interface unit 135.

In addition, the control unit 170 may control the image display apparatus 100 by the user command through the user input interface unit 150 or an internal program. Further the control unit 170 may access to a network so that the user may download desired applications or application lists into the image display apparatus 100.

In addition, the control unit 170 may control to reproduce contents/images stored in the image display apparatus 100, or received broadcast contents, and external input contents input from the outside. The contents may be in various forms such as broadcast image, external input image, audio file, still image, a connected web screen, and a document file.

The display unit 180 may generate driving signals by converting image signals, data signals, OSD signals processed from the control unit 170 or image signals, data signals, and the like received from the external interface unit 135 into R, G, B signals, respectively, To this end, the display unit 180 may use a PDP, a LCD, an OLED, a flexible display, a 3D display and the like, and input device which includes a touch screen in addition to the output device may be also used.

The audio output unit 185 may receive and output voice/audio processed signals in the control unit 170, for example, stereo signals, 3.1 channel signals or 5.1 channel signals by voice, which is implemented using speakers of the various types.

Meanwhile, the image display apparatus 100 may further include an imaging unit for acquiring an image of the user, and the image information acquired from the imaging unit may be input to the control unit 170. For instance, the imaging unit may be a camera for capturing an image of the user or other item.

The power supply 190 may supply power to the image display apparatus 100 throughout, for example, the control unit 170, the display unit 180 and the audio output unit 185, which are implemented in the form of System On Chip (SOC).

The remote control device 200 transmits the user input to the user input interface unit 150. To this end, the remote control device 200 may use Bluetooth, Radio Frequency (RF) communication, Infrared (IR) communication, Ultra Wideband (UWB), ZigBee standards and the like. In addition, the remote control device 200 may receive image, voice or data signals, and the like output from the user input interface unit 150, and display their signals from the remote control device 200 or output voice or vibration.

Meanwhile, since the image display apparatus 100 as shown FIG. 1 or 2 is an embodiment of the present invention, some of the shown components may be integrated, added or omitted, depending on certain aspects of the actually implemented image display apparatus 100.

For instance, the image display apparatus 100 may be configured to integrate two or more components into one component or subdivide one component into two or more components, as necessary. In addition, since the functions performed by each block are intended to describe an embodiment of the present invention, the scope of rights of the present invention is not limited to the specific operation or devices.

According to another embodiment of the present invention, the image display apparatus 100 may receive and reproduce images through the network interface unit 133 or the external interface unit 135 without including the tuner 131 and demodulator 132. For example, the image display apparatus 100 may be separately implemented by the image processing device such as set-top boxes for receiving contents according to the broadcast signal or various network services and content reproducing device to reproduce contents input from the image processing apparatus.

In this case, a program display method, according to an embodiment of the present invention to be described below, may be performed by any one of an image processing device such as the separated set-top box or a content reproducing device including the display unit 180 and the audio output unit 185, as well as the image display apparatus 100 as described with reference to FIG. 1 or 2. For the sake of brevity, however, the methods of the invention are described below in reference to using the image display apparatus 100 of FIG. 2.

Figure 3:
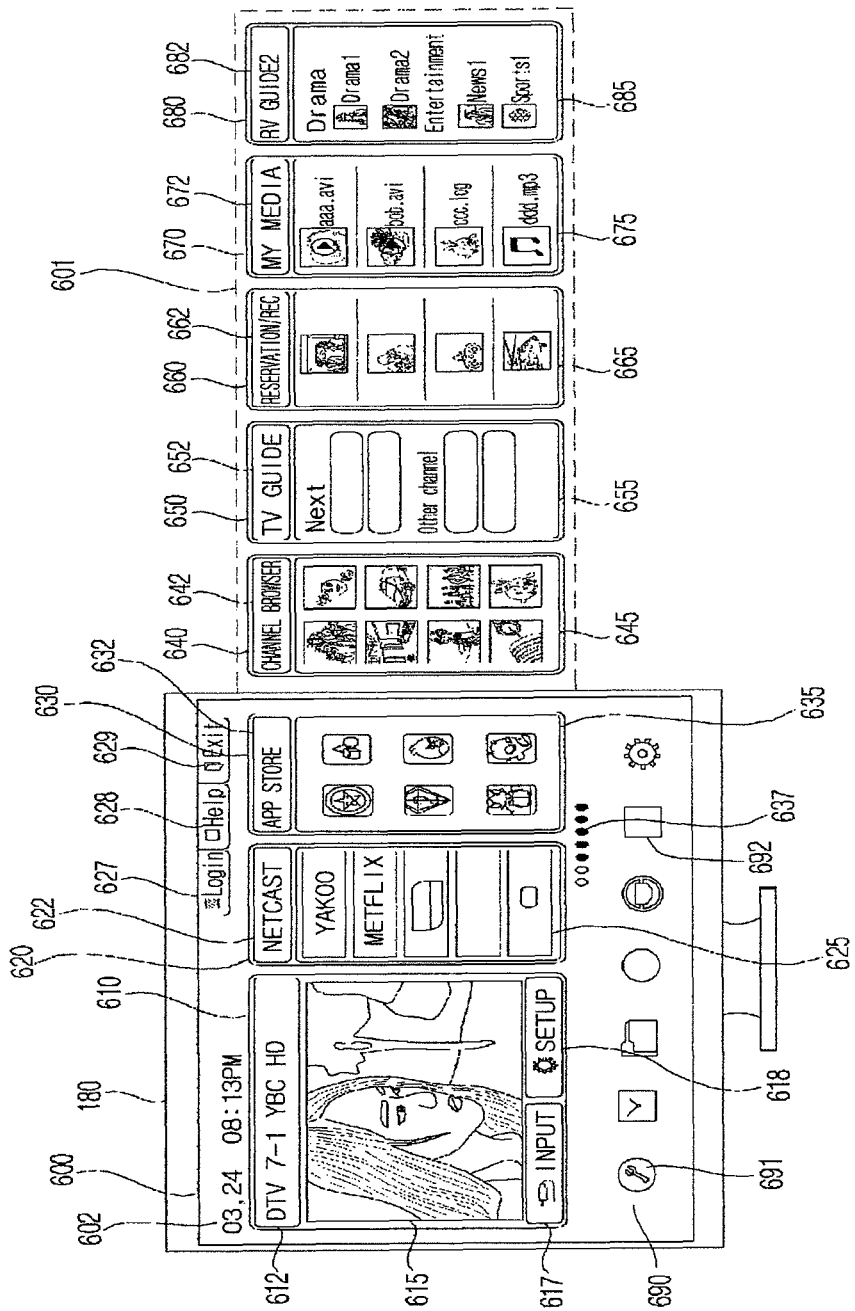
FIG. 3 is a diagram showing an example of a home screen configuration displayed on an image display apparatus according to the present invention.

FIG. 3 is a diagram showing a home screen configuration displayed on an image display apparatus according to an embodiment of the present invention.

The home screen configuration shown in FIG. 3 may be an example of the basic screen configuration of the image display apparatus 100 described above. Further, such a screen may be set to an initial screen when power is on, or power is on in standby mode or a basic screen by the operation of a local key or a home key provided in the remote control device 200.

Referring to FIG. 3, the home screen 600 may include a card object area, and the card object area may include a plurality of card objects 610, 620, 630 separated by each source of contents.

The card objects as shown may include a card object (BROADCAST) 610 representing a broadcast image, a card object (NETCAST) 620 representing a content provider (CP) list, and a card object (APPSTORE) 630 representing an application provision list, displayed on the display unit 180.

In addition, as shown, other card objects 640, 650, 660, 670 and 680 may be disposed in a hidden area 601 not visible to the user and may become visible to the user by being visually displayed on the screen as the card objects are selected and moved around. The other card objects may include a card object (CHANNEL BROWSER) 640 representing a thumbnail list of the broadcast channel, a card object (TV GUIDE) 650 representing a broadcast guide list, a card object (RESERVATION/REC) 660 representing a broadcast reservation list or a recording list, a card object (MY MEDIA) 670 representing a media list in devices connected to the image display apparatus 100 or within the image display apparatus 100, and a card object (TV GUIDE2) 680 representing the broadcast guide list, and the like.

The card object (BROADCAST) 610 which displays a broadcast image may include a broadcast image 615 received through the tuner 131 or the network interface unit 130, an object 612 representing the corresponding broadcast image-related information, an object 617 representing the external device, and a set up object 618

The broadcast image 615 may be displayed as the card object, and its size is fixed by a lock function, such that the user may still be watched the broadcast image. The size of the broadcast image 615 being displayed can be adjusted by the operation of the user. For example, the size of the corresponding broadcast image 615 may be enlarged or reduced by a drag using the pointer 205 of the remote control device 200. By the enlargement or reduction, the number of the card objects displayed on the display unit 180 may be changed to two or four, and the like instead of three as shown in FIG. 3.

Meanwhile, when the broadcast image 615 displayed within the card object 610 is selected, the corresponding broadcast image 615 is enlarged and displayed on the entire screen of the display unit 180 of the image display apparatus 100.

The object 612 which represents information related to the corresponding broadcast image 615 may include a channel number (DTV7-1), a channel name (YBC HD), a broadcast program name (Oh! Lady), a broadcast time (pm 08:00 to 08:50), and the like for the broadcast image 615. Thereby, the user may intuitively understand information regarding the broadcast image 615 to be displayed or being displayed.

When the object 612 which represents the information related to the corresponding broadcast image is selected, the associated EPG information may be displayed on the display unit 180.

Meanwhile, the object 602 which represents current Date (03.24), Day (THU) and current time (pm 08:13) may be displayed on the card object 610 which represents the broadcast image. Thereby, the user may intuitively understand the time information.

The object 617 representing the external device(s) may represent one or more external devices connected or connectable to the image display apparatus 100. For example, when the corresponding object 617 is selected, a list of the external device connected or connectable to the image display apparatus 100 may be displayed for the user's selection of the external device.

The set up object 618 may be used to input various settings of the image display apparatus 100. For example, various settings such as an image setting, an audio setting, a screen setting, a reservation setting, a pointer setting of the remote control device 200, a network setting, and the like may be performed using the set up object 618. When the set up object 618 is selected, a list of menus for setting or modifying these functions may be provided for the user.

Meanwhile, the card object 620 which represents the content provider (CP) list may include a card object name (NETCAST) 622 and a content provider list 625. In FIG. 3, the content provider within the content provider list 625 is illustrated as Yakoo, Metflix, weather.com, Picason, My tube, and the like as mere examples, but various settings are possible.

When the card object name 622 is selected, the corresponding card object 620 is displayed on the entire screen of the display unit 180.

Meanwhile, when the content provider within the content provider list 625 is selected, the screen including the content list provided by the corresponding content provider may be displayed on the display unit 180.

The card object 630 which represents the application providing list may include a card object name (APP STORE) 632 and an application list 635. The application list 635 may be a list classified and sorted for each item in the application store. In FIG. 3, the popular order (HOT), the newest order (New), and the like are illustrated, but these are explained as only examples, and various other examples are available.

When the card object name 632 is selected, the corresponding card object 630 is displayed on the entire screen of the display unit 180.

When a predetermined application item within the application list 635 is selected, the screen which provides information regarding the corresponding application may be displayed on the display unit 180.

A login item 627, a help item 628 and an exit item 629 may be displayed on the upper part of the card objects 620, 630. The login item 627 may be used at login of the network in which an application store or the image display apparatus 100 is connected. The help item 628 may be used to seek help during the operation of the image display apparatus 100. The exit item 629 may be used to exit from the corresponding home screen. At this time, the received broadcast image may be displayed on the entire/full screen of the display unit 180.

The object 637 which represents the total number of the available card objects may be displayed on the lower part of the card object 620, 630. The object 637 may represent the total number of all available card objects as well as the number of the card objects displayed on the display unit 180 among the available card objects. In FIG. 3, the object 637 shows that three object cards (610, 620, 630) are currently being displayed among all available eight object cards.

The card object 640 which represents the thumbnail list of the broadcast channel may include a card object name (CHANNEL BROWSER) 642 and a thumbnail list 645 of the broadcast channel. In FIG. 3, sequentially received broadcast channels are represented as the thumbnail images, but these are explained as only one example, and a moving image is also available. The thumbnail list may include both of the thumbnail image and the channel information of a corresponding channel. Thereby, the user may intuitively understand the contents of the corresponding channel.

The thumbnail images may be thumbnail images for preference/favorite channels pre-registered by the user or may be thumbnail images for a later or earlier channel of the broadcast image 615 within the card object 610. Meanwhile, the eight thumbnail images are illustrated in FIG. 3, but any number of desired thumbnail images can be displayed since various settings are possible. In addition, the thumbnail images within the thumbnail list may be updated.

When the card object name 642 is selected, the corresponding card object 640 is displayed on the entire screen of the display unit 180. For instance, the contents regarding the thumbnail list may be displayed on the display unit 180.

When a predetermined thumbnail image within the thumbnail list 645 of the broadcast channel is selected by the user, the broadcast image corresponding to the thumbnail image may be displayed on the display unit 180.

The card object 650 which represents the broadcast guide list may include a card object name (TV GUIDE) 652 and a broadcast guide list 655. The broadcast guide list 655 may be a list regarding the broadcast image of another channel or the broadcast program after the broadcast image 615 within the card object 610, but is not limited thereto. Various examples are possible.

When the card object name 652 is selected, the corresponding card object 650 is displayed on the entire screen of the display unit 180.

Meanwhile, when a predetermined broadcast item within the broadcast guide list 655 is selected, the broadcast image corresponding to the broadcast item may be displayed on the display unit 180, or the broadcast information corresponding to the broadcast item may be displayed on the display unit 180.

The card object 660 which represents the broadcast reservation list or the recording list may include a card object name (RESERVATION/REC) 662 and the broadcast reservation list or the recording list 655. The broadcast reservation list or the recording list 665 may be a list including a broadcast item reserved in advance by the user or a broadcast item recorded accordingly. In FIG. 3, the thumbnail images may be included for each item, but various examples are possible.

When the card object name 662 is selected, the corresponding card object 660 is displayed on the entire screen of the display unit 180.

In addition, when the broadcast reservation list or the broadcast item reserved in advance by the user or the broadcast item recorded within the recording list 665 is selected, the broadcast information about the corresponding broadcast or recorded broadcast image may be displayed on the display unit 180.

The card object 670 which represents the media list may include a card object name (MY MEDIA) 672 and a media list 675. The media list 675 may be a media list within devices within the image display apparatus 100 or devices connected to the image display apparatus 100. In FIG. 3, the moving image, the still image, the audio, and the like are illustrated, but various examples such as a text document, e-book document, and the like are possible.

When the card object name 672 is selected, the corresponding card object 670 is displayed on the entire screen of the display unit 180.

Meanwhile, when a predetermined media item within the media list 675 is selected, the corresponding media may be performed, and the screen corresponding to the media may be displayed on the display unit 180.

The card object 680 which represents the broadcast guide list may include a card object name (TV GUIDE2) 682 and a broadcast guide list 685. The broadcast guide list 685 may be a guide list for each broadcast category. In FIG. 3, the list for each broadcast category classified by an entertainment such as news or sports is illustrated, but various examples are possible. For instance, the list of the category may be a broadcast guide list for each category such as drama, movies, news, sports, animation, and the like. Thereby, the user may confirm the guide list classified by genre of the broadcast.

When the card object name 682 is selected, the corresponding card object 680 is displayed on the entire screen of the display unit 180.

Meanwhile, when a predetermined application item within the application guide list 685 is selected, the screen corresponding to the broadcast image may be displayed on the display unit 180.

The card objects 620, 630 displayed (visible) on the display unit 180, and the card objects 640, 650, 660, 670, 680 not displayed (visible) on the display unit 180 and located in a hidden area 601 are replaced by each other according to the movement input of the card object.

For example, the least one of the card objects 620, 630 displayed on the display unit 180 may be moved to the hidden area 601, and the least one of the card objects 640, 650, 660, 670, 680 located in the hidden area 601 may be displayed on the display unit 180. In one example, this can occur simultaneously so that the card object moved from the hidden area into the visible area replaces the card object being moved to the hidden area from the visible area.

Meanwhile, the home screen 600 of the image display apparatus 100 may further include a card object which represents information associated with a software upgrade.

Figure 4:
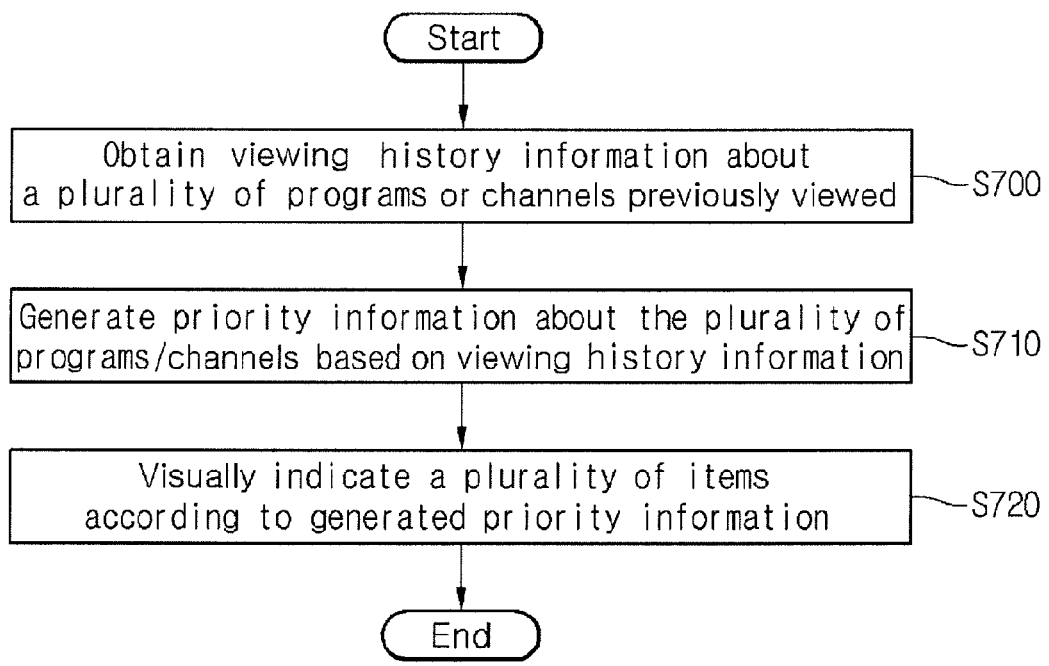
FIG. 4 is a flow chart showing a program information display method of an image display apparatus according to one embodiment of the present invention.

Hereinafter, a broadcast channel display method according to a first embodiment of the present invention will be described with reference to FIGS. 4 to 11. FIG. 4 is a flow chart showing a program information display method of an image display apparatus according to the first embodiment of the present invention. FIGS. 5 to 11 are diagrams showing a method for visualizing and displaying the program information of the image display apparatus according to the first embodiment of the present invention on a screen.

Referring to FIGS. 4 to 11, the program information display method according to the first embodiment of the present invention may be performed by the image display apparatus 100 of FIG. 1 or 2 for displaying at least one broadcast channel selected by the user among a plurality of broadcast channels according to a broadcast signal input from the outside. For the sake of brevity, the method will be described referring to the apparatus 100 of FIG. 2.

Referring to FIG. 4, the control unit 170 obtains viewing history information about a plurality of preference programs or channels (S700). For instance, the control unit 170 obtains information about the programs and/or channels previously viewed by the user(s) or played at the image display apparatus 100. In one variation, the control unit 170 may collect such viewing history information for each different user, e.g., by associating each program/channel viewed by a specific user which may be done, e.g., by requesting a user to enter their user information prior to viewing the program/channel.

The plurality of preference programs may be content programs provided by a content provider or a broadcast channel program, or may be any content being viewed by the user. The plurality of preference channels may be channels provided by a content provider or carrying the broadcast programs. Viewing history information about watched time or the like and specific codes (text codes) for the type, the title, the viewing time, the viewing time zone or the like regarding a plurality of preference programs, for example, broadcast programs being viewed from the program guide information in a case of viewing the broadcast program are stored in storage unit 140, and such storing is can be repeatedly performed each time the user views any broadcast programs.

Next, after the storage operation is performed over a period of time, the control unit 170 classifies the collected viewing history over a period of time, and analyzes the stored broadcast program/channel information viewed/displayed up to now and viewing pattern information or the like through the recorded viewing time zone and viewing time based on any one of for each day of the week and each time zone. Herein, the period of time may be changed to years, months, weeks, days, etc. according to the user' settings.

Meanwhile, as mentioned above, the viewing history information may be obtained for each different individual viewer and in order to obtain the viewing history information for each individual viewer, the viewers may log in for each individual viewer when turning on the image display apparatus.

Next, the control unit 170 generates priority information about a plurality of preference programs or channels based on the viewing history information. The priority information may be calculated on the basis of any one of viewing time, the number of times of viewing, last viewing time of the viewing history information.

For example, when the period of time is set to one week, if viewing time of 6-channel (Channel 6), 7-channel (Channel 7) and 11-channel (Channel 11) is 23 hours, 18 hours, and 11 hours, respectively, for a week, the 6-channel, 7-channel, and 11-channel sequentially have the first to third priority and such priority information is stored in the storage unit 140.

As another example, if 6-channel, 7-channel and 11-channel were watched about six hours ago, about two hours ago and about eight hours ago, respectively, based on the current time, the 7-channel, 6-channel, and 11-channel sequentially have the first to third priority and such priority information is stored in the storage unit 140.

Meanwhile, the priority information may be calculated by combining two or more information of viewing time, the number of times of viewing, last viewing time of the viewing history information. Herein, each of the two or more information of the viewing history information may be weighted and the priority information is calculated, and the weights may be changed depending on the user's settings.

For example, when the weight of the viewing time is set to 1 and the weight of the number of times of viewing is set to 1.5, then if, for a week, the viewing time of 6-channel is 23 hours and the number of viewing is 10 times, the viewing time of 7-channel is 18 hours and the number of viewing is 20 times and the viewing time of 11-channel is 11 hours and the number of viewing is 4 times, the priority score of 6-channel is calculated to be 23*1+10*1.5=38, the priority score of 7-channel is calculated to be 18*1+20*1.5=48, and the priority score of 11-channel is calculated to be 11*1+4*1.5=17, according to the set weight information.

According to the calculated priority scores, the priority information may be calculated such that the 7-channel, 6-channel and 11-channel are ranked to have the first priority, the second priority and the third priority, respectively, and the determined priority information may be stored in the storage unit 140. Meanwhile, the priority information may be calculated by separating for at least one of each day of the week, each time zone, each genre, etc.

When the control unit 170 receives a channel browser entry command through the user input interface unit 150, the control unit 170 visually indicates a plurality of items indicating each of program/channel information to be distinct from each other according to the priority information generated, on a screen of the display unit 180 (S720).

The visually indicating step (S720), which may be provided by various methods, will be described below in more detail with reference to FIGS. 5 to 11. In the examples of FIGS. 5-11, different shapes, colors and configurations for each of the items are possible. For instance, although a circular item 810 is displayed in FIG. 5, the item 810 can have a different shape such as a square, rectangle or oval. In the examples of the present invention, at least one of different shapes, sizes, configurations, colors, fonts, icons, symbols, patterns, texts, etc. may be used to visually display the items indicating programs/channels differently from each other to reflect the different priorities of such items, so that the user can visually recognize the priorities of such items.

Figure 5:
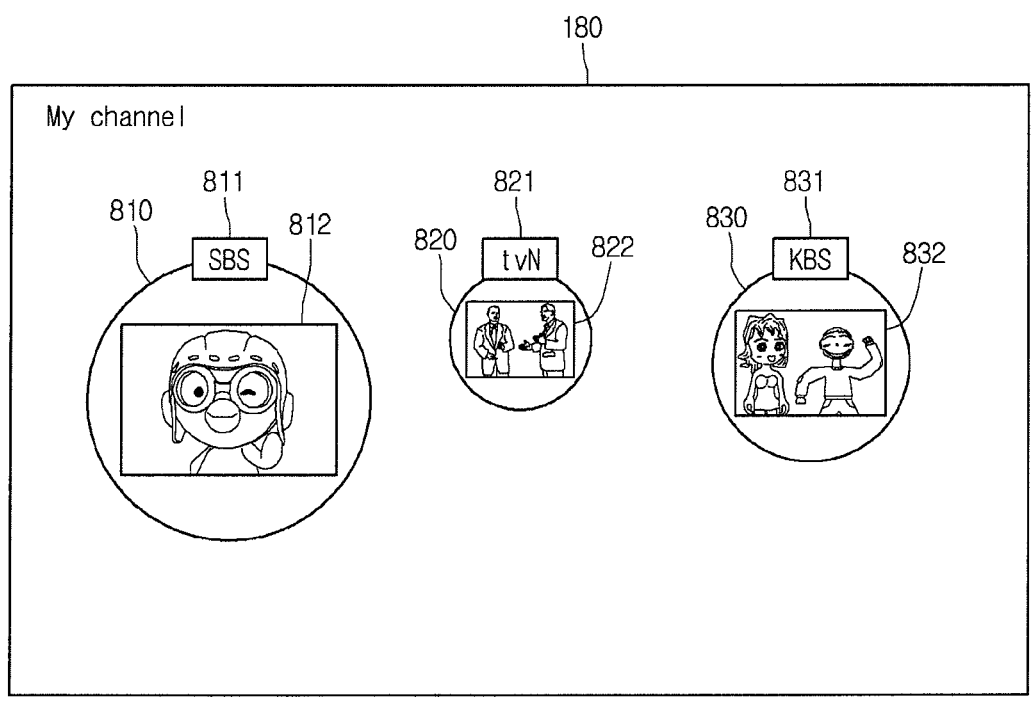

Referring to FIG. 5, a plurality of items 810, 820, 830 each representing one of a plurality of preference items may be visually indicated to be distinct from each other by varying the size of each item 810, 820, 830 according to the priority information.

First, the plurality of items 810, 820, 830 each representing one of the plurality of preference programs or channels are displayed on the display unit 180. Herein, the first item 810, the second item 820 and the third item 830 may be items representing 6-channel, 11-channel and 7-channel, respectively.

Each of the items 810, 820, 830 may display one of ions 811, 821, 831 each indicating broadcast channel information or content provider information representing each of the programs. For example, the first item 810 is an item representing 6-channel, and an icon 811, showing that the content provider providing the program(s) corresponding to 6-channel is for example SBS, may be indicated on or near the first item 810. In this example, SBS, tvN and KBS are mere examples of channel stations.

Meanwhile, each of the items 810, 820, 830 can indicate a representative thumbnail image 812, 822, 832 corresponding to each of programs or channels. For example, the first item 810 is an item representing 6-channel, and thus the representative thumbnail image 812 representing a program corresponding to 6-channel is indicated on the first item 810.

As mentioned above, the icons 811, 821, 831 and the representative thumbnail images 812, 822, 832 representing the broadcast channel information or content provider information are indicated on or near the items 810, 820, 830, respectively. Accordingly, the user can intuitively recognize by viewing the items 810, 820, 830 which program/channel each item represents.

According to the present invention, the plurality of items 810, 820, 830 are visually indicated to be distinct from each other based on the priority information. As shown in FIG. 5, a high priority item among the plurality of items may be largely indicated than a lower priority item among the plurality of items.

For example, assume that the first item 810 representing 6-channel has been ranked to have a first priority based on the calculated priority information (S710), the second item 820 representing 11-channel has been ranked to have a third priority based on the calculated priority information, and the third item 830 representing 7-channel has been ranked to have a second priority based on the calculated priority information.

Then such priority of each channel (or program in another example) may be visually indicated to the user by varying the size of the corresponding item being displayed to the user according to the priority. For instance, in the above example, the size of the first item 810 is displayed to be the largest since it has the first priority (highest priority), the size of the third item 830 is displayed to be less than that of the first item 810 since it has the second priority lower than the first priority, and the size of the second item 820 is less than that of the third item 830 since it has the third priority lower than the second priority. Accordingly, each of the items can be visually indicated to be distinct from each other to correspond with the priority information.

Herein, in each of the items 810, 820, 830, the size thereof may be determined in proportion to the priority scores. In addition, the sizes of the icons 811, 821, 831 and representative thumbnail images 812, 822, 832 included in each of the items 810, 820, 830 may be also determined In proportion to the sizes of each of the items 810, 820, 830.

Figure 6:
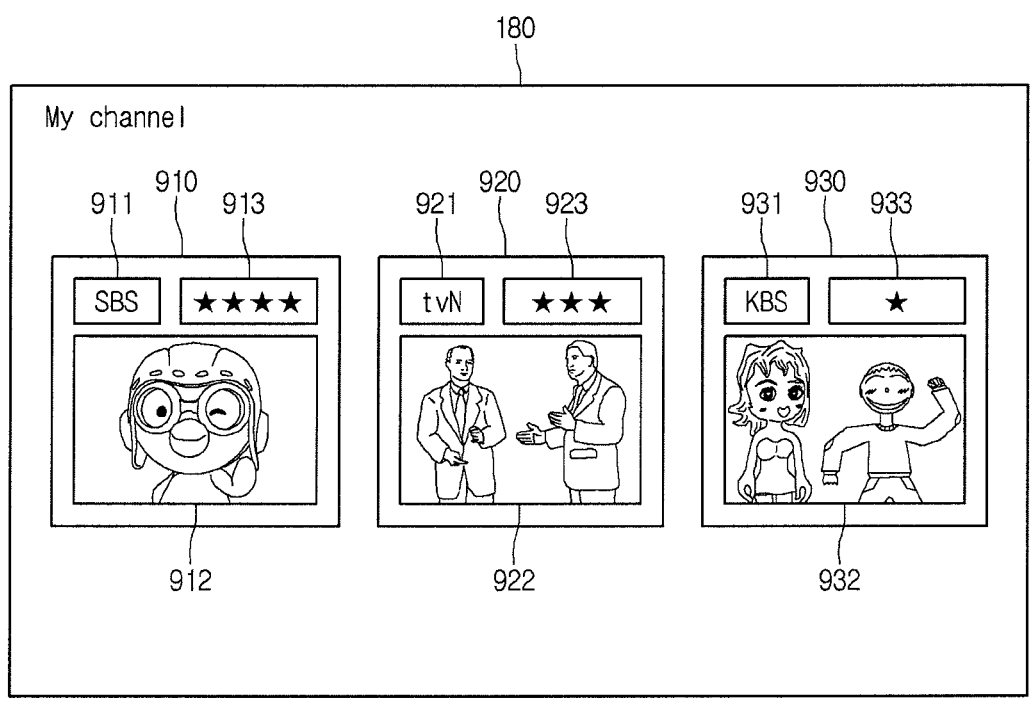

In another example, referring to FIG. 6, a plurality of items 910, 920, 930 representing a plurality of preference programs or channels may be visually indicated to be distinct from each other by varying the number of specific marks displayed therewith.

First, the plurality of items 910, 920, 930 each representing one or more of the plurality of preference programs or channels are displayed on the display unit 180. Herein, the first item 910, the second item 920 and the third item 930 may be items representing 6-channel, 11-channel and 7-channel, respectively.

Each of the items 910, 920, 930 may indicate one of ions 911, 921, 931 indicating broadcast channel information or content provider information representing each of the programs/channels. For example, the first item 910 is an item representing 6-channel, and an icon 911, showing that the content provider providing the program corresponding to 6-channel is SBS, may be indicated on or near the first item 910.

Each of the items 910, 920, 930 can further include representative thumbnail image 912, 922, 932 corresponding to each of programs/channels. For example, the first item 910 is an item representing 6-channel, and the representative thumbnail image 912 representing a program corresponding to 6-channel may be displayed on or near the first item 910.

Meanwhile, the plurality of items 910, 920, 930 are visually indicated to be distinct from each other based on their priority information and at least one or more of specific marks are indicated on or in association with each of the plurality of items to reflect such priority information. For instance, the number of the specific marks indicated on the high priority item among the plurality of items may be largely indicated than the number of the specific marks indicated on the lower priority item, as shown in FIG. 6.

For example, assume that the first item 910 representing 6-channel has been ranked to have the first priority based on the calculated priority information, the second item 920 representing 11-channel has been ranked to have the second priority based on the calculated priority information, and the third item 930 representing 7-channel has been ranked to have the third priority based on the calculated priority information.

In this case, based on the calculated priority, a specific mark indicated on a specific area 913 of the first item 910 is display with 4 stars, a specific mark indicated on a specific area 923 of the second item 920 is display with 3 stars and the a specific mark indicated on a specific area 933 of the third item 930 is displayed with 1 star. Accordingly, each of the items 910, 920, 930 can be visually indicated to be distinct from each other according to their priority information.

Herein, the number of the specific marks included in each of the items 910, 920, 930 may be determined in proportion to the priority scores. As a result, the user can view the number of stars displayed for each item representing a program/channel and thereby recognize the priority of that program/channel in comparison with other items displayed on the screen. Here, the use of stars is merely an example, and any specific mark can be used to reflect the priorities.

Figure 7:
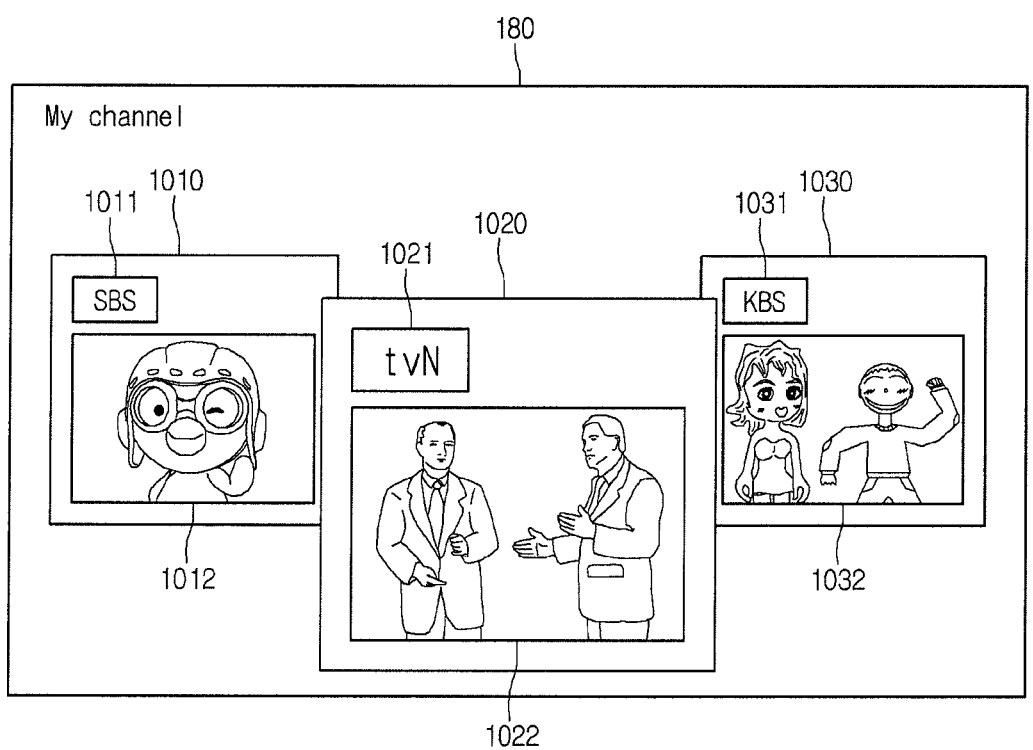

In another example, referring to FIG. 7, a plurality of items 1010, 1020, 1030 representing a plurality of preference programs/channels are indicated by overlapping with each other, and the high priority item of the plurality of items may be indicated to be arranged on the front or the center relatively compared with the lower priority items to visually indicate the priorities of these items.

First, the plurality of items 1010, 1020, 1030 representing the plurality of preference programs or channels are displayed on the display unit 180. Herein, the first item 1010, the second item 1020 and the third item 1030 may be items representing 6-channel, 11-channel and 7-channel, respectively.

Each of the items 1010, 1020, 1030 may indicate one of icons 1011, 1021, 1031 indicating broadcast channel information or content provider information representing each of the programs or channels. Meanwhile, each of items 1010, 1020, 1030 can indicate a representative thumbnail image 1012, 1022, 1032 corresponding to each of programs/channels. For example, the first item 1010 is an item representing 6-channel, and the representative thumbnail image 1012 representing a program corresponding to 6-channel may be indicated on or near the first item 1010.

The plurality of items 1010, 1020, 1030 are visually indicated to be distinct from each other according to their priority information, by overlapping and arranging the plurality of items 1010, 1020, 1030 according to their priority. For instance, the high priority item of the plurality of items may be indicated to be arranged on the front or the center relatively compared with the lower priority item, as shown in FIG. 7.

For example, assume that the first item 1010 representing 6-channel (SBS) has been ranked to have the second priority based on the calculated priority information, the second item 1020 representing 11-channel (tvN) has been ranked to have the first priority based on the calculated priority information, and the third item 1030 representing 7-channel (KBS) has been ranked to have the third priority based on the calculated priority information.

In this case, the first item 1010, the second item 1020 and the third item 1030 are displayed to be overlapped with each other, where the second item 1020 which has the first priority according to the priority may be indicated to be arranged on the forefront or the center relatively compared with the first item 1010 and the third item 1030 have less priority. Herein, further, in each of the items 1010, 1020, 1030, the size thereof may be determined in proportion to the priority scores. In addition, the sizes of the icons 1011, 1021, 1031 and representative thumbnail images 1012, 1022, 1032 included in or near each of the items 1010, 1020, 1030 may be also determined in proportion to the sizes of each of the items 1010, 1020, 1030.

Further, since the items regarding the program/channel information are arranged to be overlapped, much more information may be displayed on the channel browser screen. In addition, since it allows the user to view the items in a three-dimensional structure, the user can intuitively feel the priority information of the program due to the three-dimensional perspective.

Meanwhile, each of the plurality of items 810, 820, 830 may further include a section thumbnail image in addition to the representative thumbnail image, which will be described with reference to FIG. 8 in detail. The concept of FIG. 8 can be applied to any of the methods discussed above including the methods of FIGS. 5-7. As an example only, however, the concept of FIG. 8 is discussed as being applied to the visual indication method of FIG. 5.

As shown in FIG. 8(a), the representative thumbnail images 812, 822, 832 corresponding to the programs or channels are visually indicated on each of the items 810, 820, 830 representing programs/channels displayed on the display unit 180. This is what was shown in FIG. 5.

As shown in FIG. 8(b), when the user locates a pointer 850 on or near any one of the plurality of items 810, 820, 830, then one or more section thumbnail images may be displayed. For example, if the user places the pointer 850 on the representative thumbnail image 812 indicated on the first item 810 through the user input interface unit 150, a plurality of section thumbnail images 840 of a program related to the representative thumbnail image 812 may be displayed on or near the first item 810.

Each section thumbnail image 840 may be a thumbnail image which represents each section divided when the entire section of the program related to the representative thumbnail image 812 is divided for each specific section. For instance, each section thumbnail image 840 may represent a thumbnail image of a section of a program or a portion of the program identified by the representative thumbnail image 812.

Further, the user may select one of the displayed section thumbnail images 840 to play that section of the program. For instance, after placing the pointer 850 on any one of the plurality of indicated section thumbnail images 840, if the user selects a specific section thumbnail image among the images 840 by using the pointer 850 or other means, the program may be reproduced and played from the section corresponding to the selected section thumbnail image.

Meanwhile, each of the plurality of items 810, 820, 830 may further include additional information regarding each corresponded program and/or channel, which will be described with reference to FIG. 9 in detail. The concept of FIG. 9 can be applied to any of the methods discussed above including the methods of FIGS. 5-8. As an example only, however, the concept of FIG. 9 is discussed as being applied to the visual indication method of FIG. 5.

As shown in FIG. 9(a), the plurality of items 810, 820, 830 are indicated, and the icons 811 821 831 representing the broadcast channel information or content provider information are indicated on each of the items 810, 820, 830 as also shown in FIG. 5.

As shown in FIG. 9(b), when the user locates a pointer 850 on or near any one of the plurality of items 810, 820, 830, additional information about the selected program or channel may be displayed, e.g., as a pop-up or in some other manner. For example, if the user places the pointer 850 on the icon 811 (or selects the icon 811 using the pointer 850) representing the broadcast channel information or content provider information indicated on the first item 810 through the user input interface unit 150, additional information about the program and/or channel corresponding to the first item 810 may be indicated through a predetermined pop-up window 860.

The additional information indicated through the pop-up window 860 or through other manner on the screen may include at least one of channel information, genre information, title information and broadcast time information about the program/channel, and/or content provider information.

Meanwhile, the method of visually indicating the plurality items information to be distinct from each other based on the priority information may be indicated to be arranged on the basis of at least one of each day of the week and each time zone, and the explanation will be described with reference to FIG. 10 in detail. The concept of FIG. 10 can be applied to any of the methods discussed above including the methods of FIGS. 5-9. As an example only, however, the concept of FIG. 10 is discussed as being applied to the visual indication method of FIG. 5.

Figure 10:
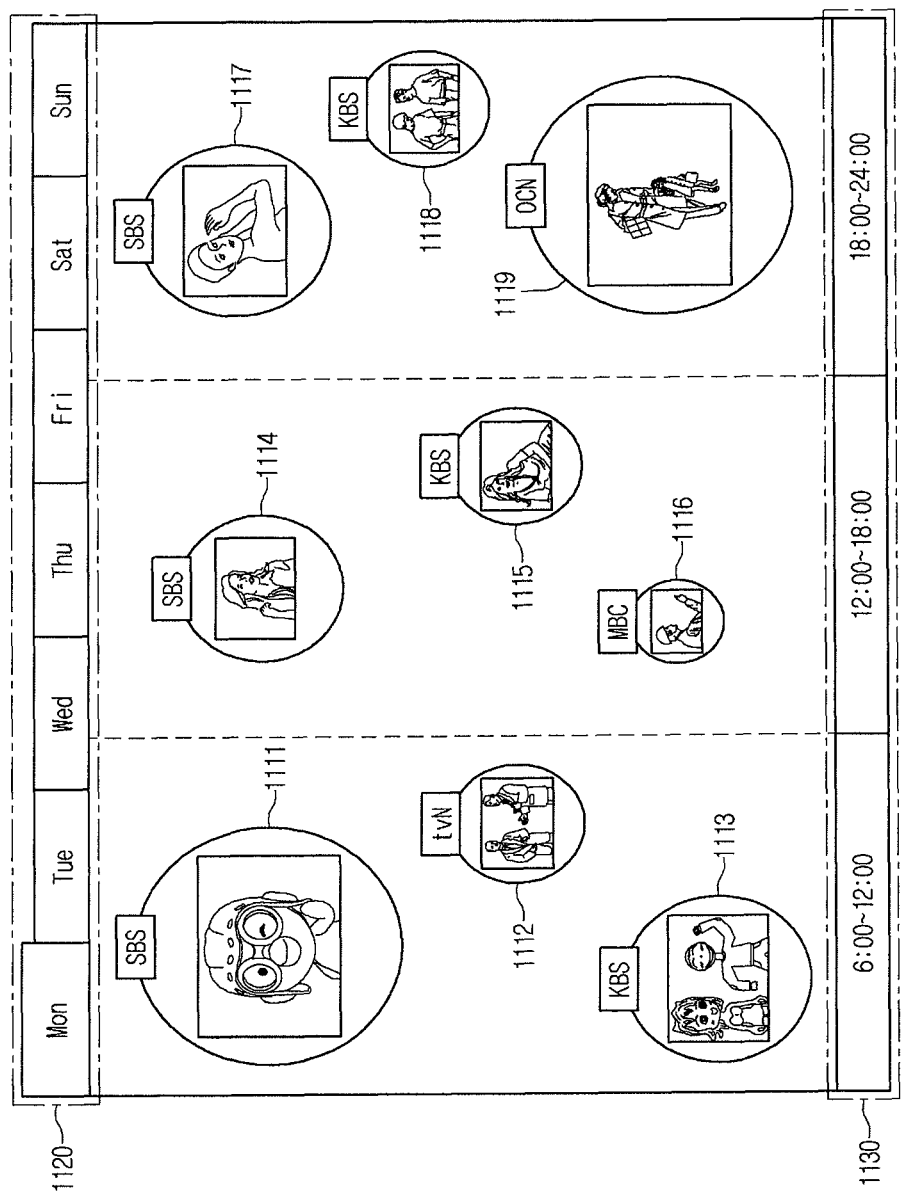

Referring to FIG. 10, a plurality of items 1111, 1112, 1113, 1114, 1115, 1116, 1117, 1118, 1119 each representing one or more of a plurality of preference programs and/or channels may be visually indicated to be distinct from each other by varying the sizes of these items according to their calculated priority information. Further, such items are organized and arranged for each day of the week and each time zone in a day.

The channel browser included in the display unit 180 may be displayed with a tap 1120 delimited by each day of the week and/or a tap 1130 delimited by each time zone. By selecting the day and/or time tap among the taps 1120 and 1130, the user can display various items corresponding to the day and/or time of the selected tap(s) while their different priority information is also visually indicated as discussed above.

When the user selects a Mon tap corresponding to "Monday" among the taps 1120 delimited by each day of the week through an input of the user input interface unit 150, the plurality of items 1111, 1112, 1113, 1114, 1115, 1116, 1117, 1118, 1119 are visually indicated on the display unit 180 to be distinct from each other according to the priority information calculated based on the viewing history information for all Mondays. In addition, the plurality of items 1111, 1112, 1113, 1114, 1115, 1116, 1117, 1118, 1119 can calculate the priority information by delimiting the viewing history information corresponding to all Mondays for each time zone.

For instance, the control unit of the image display apparatus 100 may determine that the channels/programs corresponding to the first to third items 1111, 1112, 1113 among the items are most viewed on Mondays from 6:00 to 12:00 (time zone) based on the collected viewing history information during that time. If so, the control unit determines the size of the first to third items 1111, 1112, 1113 according to their calculated priority information and then displays the first to third items 1111, 1112, 1113 according to the determined sizes under this time zone on the display unit 180.

In addition, the control unit may determine that the channels/programs corresponding to the forth to sixth items 1114, 1115, 1116 among the plurality of items are most viewed on Mondays from 12:00:00 to 18:00 time. If so, the control unit determines the size of the forth to sixth items 1114, 1115,

1116 according to their calculated priority information and then displays the forth to sixth items 1114, 1115, 1116 according to the determined sizes under this time zone on the display unit 180.

In addition, the control unit may determine that the programs/channels corresponding to the seventh to ninth items 1117, 1118, 1119 of the plurality of items are most viewed on Mondays during 18:00:00 to 24:00 time. If so, the control unit determines the size of the seventh to ninth items 1117, 1118, 1119 according to their calculated priority information and then displays the seventh to ninth items 1117, 1118, 1119 according to the determined sizes under this time zone on the display unit 180.

Herein, the setting of the time zone may be changed according to the user's setting. The items are displayed by dividing a day into three time zones in this example of the present invention, but the items may be displayed by dividing a day into any number of time zones, e.g., two to eight time zones. Further, the user can set and change the number of items that can be displayed per time zone and/or per day of the week. Moreover, the week can be divided into a weekend and a weekday, instead of seven separate days. Other variations are possible. In addition, the classifications of FIG. 10 (e.g., based on the day and/or time zone) may be done for each different user of the image display apparatus 100, or for only the favorite channels/programs designed by the user.

Figure 11:
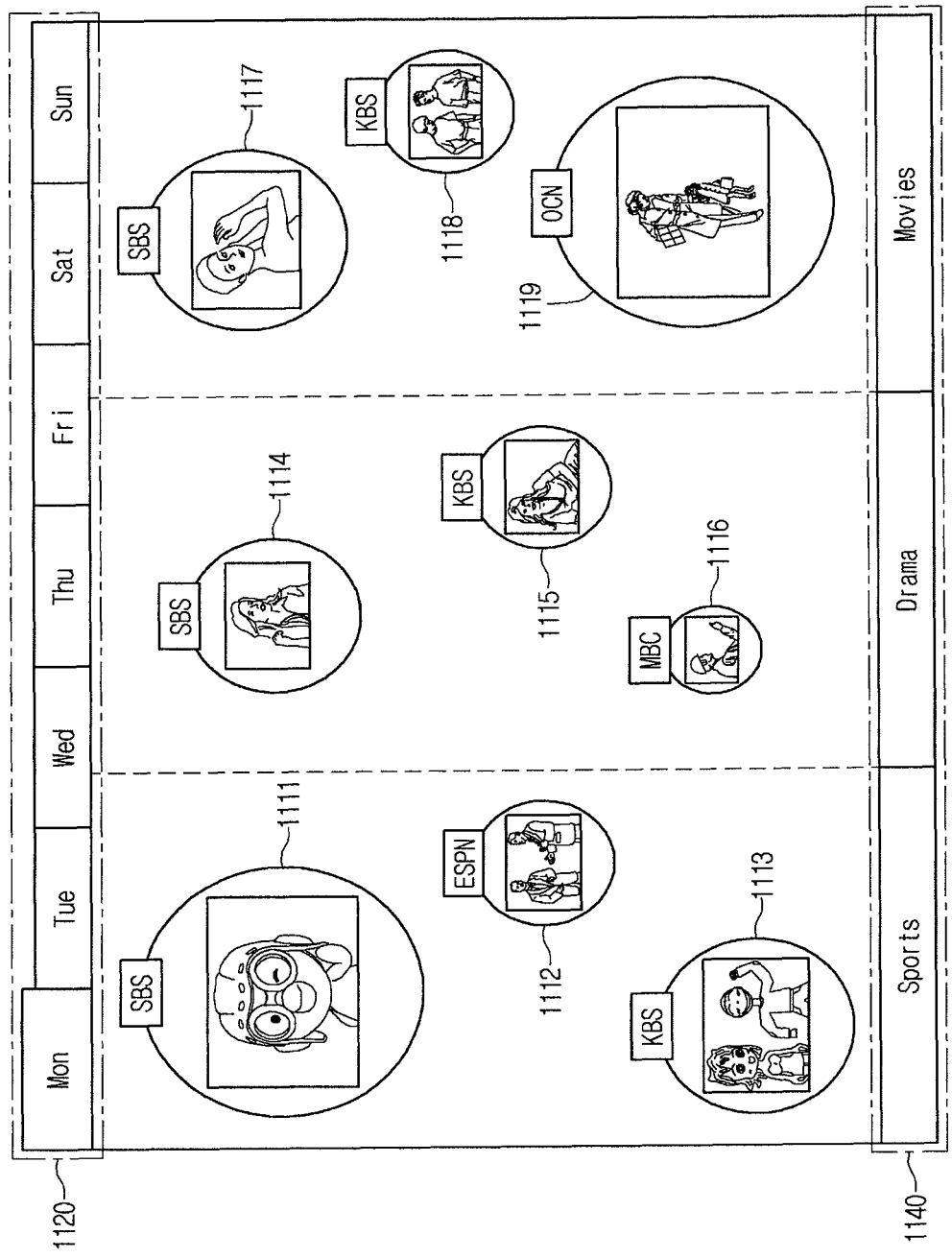

In another example, the method of visually indicating the plurality items to be distinct from each other based on their priority information may arrange the items on the basis of at least one of each day of the week and each genre, and the explanation thereof will be described with reference to FIG. 11 in detail. The concept of FIG. 11 can be applied to any of the methods discussed above including the methods of FIGS. 5-9. As an example only, however, the concept of FIG. 11 is discussed as being applied to the visual indication method of FIG. 5. The concepts of FIGS. 10 and 11 may be combined so that different taps for the day, time zone, and/or genre may be provided on a single screen for the user's selection.

Referring to FIG. 11, a plurality of items 1111, 1112, 1113, 1114, 1115, 1116, 1117, 1118, 1119 each representing one or more of a plurality of preference programs/channels may be visually indicated to be distinct from each other by varying the size thereof. These items are also arranged for each day of the week and each genre.

The channel browser included in the display unit 180 may be displayed with the tap 1120 delimited by each day of the week and a tap 1130 delimited by each genre.

When the user selects a Mon tap corresponding to Monday of the taps 1120 delimited by each day of the week through an input of the user input interface unit 150, the plurality of items 1111, 1112, 1113, 1114, 1115, 1116, 1117, 1118, 1119 are displayed to be visually distinct from each other by calculating their priority information based on the viewing history information corresponding to previous Mondays. In addition, the plurality of items 1111, 1112, 1113, 1114, 1115, 1116, 1117, 1118, 1119 are further classified according to each genre by delimiting the viewing history information corresponding to Mondays for each genre.

For instance, programs/channels corresponding to the first to third items 1111, 1112, 1113 of the plurality of items may be determined to have been most viewed on Mondays for the genre corresponding to sports. Then the control unit determines the sizes of the first to third items 1111, 1112, 1113 according to the calculated priority information and displays the first to third items 1111, 1112, 1113 according to the determined sizes under the sports genre on the display unit 180.

In addition, programs/channels corresponding to the forth to sixth items 1114, 1115, 1116 may be determined to have been most viewed based on the viewing history information of the genre corresponding to drama on Mondays. Then the control unit determines the sizes of the forth to sixth items 1114, 1115, 1116 according to their calculated priority information and displays the forth to sixth items 1114, 1115, 1116 according to the determined sizes under the drama genre on the display unit 180.

In addition, programs/channels corresponding to the seventh to ninth items 1117, 1118, 1119 of the plurality of items may be determined to have been most viewed based on the viewing history information of the genre corresponding to movies on Mondays. Then the control unit determines the sizes of the seventh to ninth items 1117, 1118, 1119 according to their calculated priority information and displays the seventh to ninth items 1117, 1118, 1119 according to the determined sizes under the movies genre on the display unit 180.

Herein, the setting of the genre may be changed according to the user's setting. The items are displayed by dividing the genre into three genres, but the items may be displayed by dividing the genre into any number of genres, more or less genres.

Figure 12:
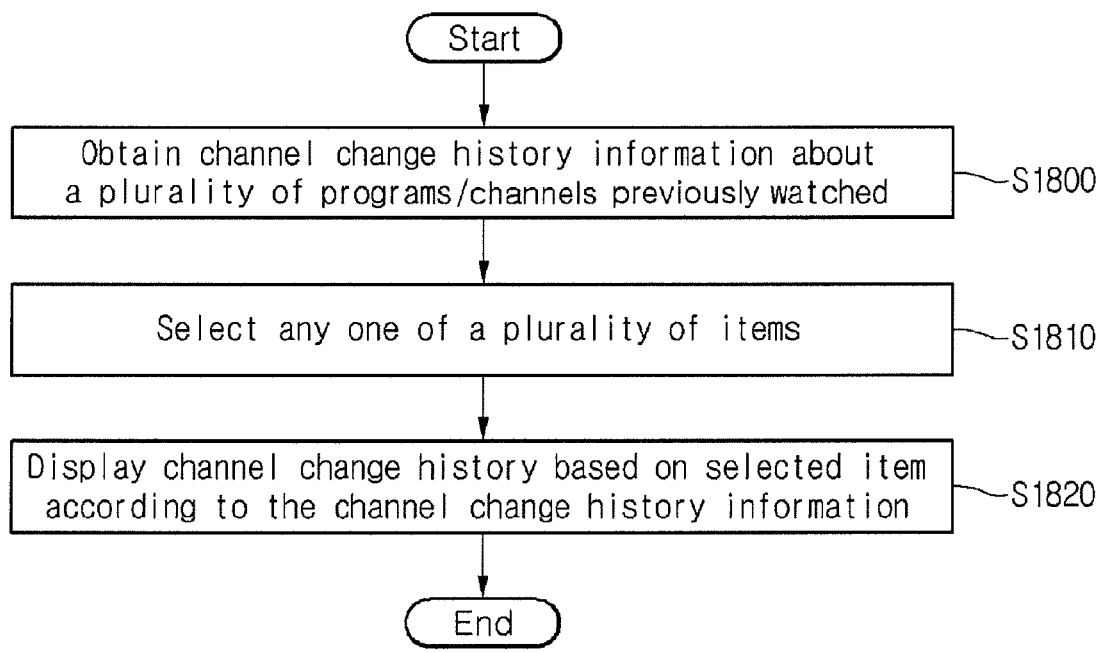
FIG. 12 is a flow chart showing a program information display method of an image display apparatus according to another embodiment of the present invention.

FIG. 12 is a flow chart showing a program information display method of an image display apparatus according to another embodiment of the present invention. FIG. 13 shows diagrams showing a method for visualizing and displaying the program information on a screen of the image display apparatus according to this embodiment of the present invention. The method of FIGS. 12-13 can be implemented by the image display apparatus 100 of FIG. 1 or 2.

Referring to FIG. 12, the control unit 170 obtains channel change information about a plurality of preference programs or channels previously viewed on the screen of the image display apparatus 100 (S1800).

Herein, the channel change history information may be information about a time in which signals about the channel change are input, a channel number of the input time, and a time section maintained for the channel number, based on signals about the channel change input through the user input interface unit 150 by the user.

Next, the user selects any one of the plurality of items displayed on the display unit 180 through the user input interface unit 150 to be distinct from each other according to the priority information using at least one of the methods discussed above (S1810).

The control unit 170 displays the channel change history on the display unit 180 on the basis of the selected items based on the channel change history information (S1820). Herein, the display of the channel change history may be performed by highlighting at least one item of changed channel on the basis of the selected items and displaying connection lines which connect the highlighted items each other. The connection lines can indicate the channel switching pattern of the user for the identified item. The concept of FIG. 12 can be applied to any of the methods discussed above including the methods of FIGS. 5-11. As an example only, however, the concept of FIG. 12 is discussed as being applied to the visual indication method of FIG. 10.

In one example, as shown in FIG. 13(a), the plurality of items 1111, 1112, 1113, 1114, 1115, 1116, 1117, 1118, 1119 each representing one or more of the plurality of preference programs/channels may be visually indicated on the display unit 180 to be distinct from each other by varying the size thereof according to their priority information. Such items may also be arranged for each day of the week and each time zone as shown in FIG. 10 previously.

When any one of the plurality of items 1110, 1111, 1112, 1113, 1114, 1115, 1116, 1117, 1118, 1119, for example, the first item 1111 is selected, items corresponding to changed channels associated with the selected first item 1111 are extracted through the channel change history information. Here the items corresponding to the changed channels associated with the selected first item 1111 can be items whose channels have been switched to or from the channel of the selected first item 1111, which can be further classified according to the day of the week.

The extracted items, for example, the fifth item 1115 and the ninth item 1119, can then be highlighted together with the selected first item 1111, and/or the connection line 1150 which connects the highlighted first item 1111, the fifth item 1115 and the ninth item 1119 to each other may be displayed on the display unit 180.

In a condition where the connection line 1150 which connects the highlighted first item 1111, fifth item 1115 and ninth item 1119 is displayed, when the user selects the fifth item 1115 through the user input interface unit 150, or when the fifth item 1115 is selected as shown in FIG. 13(b), items corresponding to changed channels associated with the selected fifth item 1115 are extracted through the channel change history information.

The extracted items, for example, the third item 1113 and the seventh item 1117 are then highlighted together with the selected fifth item 1115, and/or the connection line 1151 which connects the highlighted third item 1113, fifth item 1115 and the seventh item 1117 can be displayed on the display unit 180.

By viewing the screens of FIG. 13, the user can quickly and more intuitively recognize items of changed channels on the basis of the selected item and accordingly, the user can easily search and select programs depending on the user' viewing patterns.

The methods for displaying program information according to the embodiments of the present invention can also be embodied as programs to be executable in one or more computers/processors and be stored in one or more computer readable recording media. Examples of the computer readable recording media can include read-only memory (ROM), random-access memory (RAM), CD-ROMs, magnetic tapes, floppy disks, optical data storage devices, and so on. Furthermore, it can be implemented as carrier waves (such as data transmission through the Internet).

The computer-readable recording media are distributed on computer systems connected through a network, and thus the computer-readable recording media may be stored and executed as the computer-readable code by a distribution scheme. In addition, function programs, codes and code segments for implementing the method may be easily deduced by programmers in the field of technology belong to the present invention.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

What is claimed is:

1. A method for displaying information on an image display apparatus including a display unit, comprising:
    obtaining, by the image display apparatus, viewing history information on a plurality of programs or channels based on a previous viewing of the plurality of programs or channels;
    generating priority information for the programs or channels based on the obtained viewing history information;
    visually indicating, on the display unit, a plurality of items corresponding respectively to the plurality of programs or channels to be distinct from each other according to the generated priority information;
    obtaining, by the image display apparatus, channel change history information on the plurality of programs or channels based on a previous viewing of the plurality of programs or channels;
    receiving a user input for selecting one of the plurality of items; and
    displaying, on the display unit, a history of channel changes on the basis of the selected item based on the channel change history information,
    wherein the displayed history of channel changes indicates at least one other item of the plurality of items corresponding to at least one changed channel associated with the selected item,
    wherein the at least other item of the plurality of items corresponding to at least one changed channel is highlighted on the basis of the selected item, and
    wherein connection lines which connect the at least one highlighted item and the selected item to each other are displayed.

2. The method according to claim 1, wherein the viewing history information for a program or channel includes at least one of:
    a viewing time duration for the program or channel,
    a number of times the program or channel was viewed during a preset time period, and
    a last viewing time for the program or channel.

3. The method according to claim 1, wherein the generating step includes:
    determining the priority information for each of the programs based on (a) a viewing time duration, (b) a number of times of viewing, (c) a last viewing time, or any weighted combination of (a), (b) and (c).

4. The method according to claim 1, wherein the visually indicating step includes one of the following:
    displaying the plurality of items in different sizes to reflect different priorities of the programs or channels corresponding to the items, or
    displaying a different number of a specific mark on each of the plurality of items to reflect different priorities of the programs or channels corresponding to the items, or
    displaying the plurality of items overlapped with each other where one of the items having a highest priority is displayed at a forefront or center compared to other items to reflect different priorities of the programs or channels corresponding to the items.

5. The method according to claim 1, wherein in the visually indicating step, the plurality of items are arranged on the basis of at least one of a user, a day of the week, a time zone, and a genre.

6. The method according to claim 1, wherein the channel change history information for a program or channel includes at least one of:
    a time in which signals about a channel change are input;
    a channel number of the input time; and a time section maintained for the channel number, based on a user input.

7. The method according to claim 1, wherein each of the plurality of items includes at least one of program information, content provider information, and a representative thumbnail image associated with the program or channel corresponding to that item.

8. The method according to claim 7, further comprising:
when a user directs a pointer to a specific item among the plurality of items, displaying at least one of program information, content provider information, and other thumbnail images associated with the program or channel corresponding to the specific item.

9. The method according to claim 1, wherein the obtaining step obtains the viewing history information for each of a plurality of different viewers.

10. The method according to claim 1, further comprising:
when a specific item among the plurality of items is selected, visually indicating a channel switching pattern associated with the selected specific item.

11. An image display apparatus comprising:
a display unit; and
a control unit configured to control the display unit and to:
obtain viewing history information on a plurality of programs or channels based on a previous viewing of the plurality of programs or channels;
generate priority information for the programs or channels based on the obtained viewing history information;
visually indicate, on the display unit, a plurality of items corresponding respectively to the plurality of programs or channels to be distinct from each other according to the generated priority information;
obtain channel change history information on the plurality of programs or channels based on a previous viewing of the plurality of programs or channels;
receive a user input for selecting one of the plurality of items; and
display, on the display unit, a history of channel changes on the basis of the selected item based on the channel change history information,
wherein the displayed history of channel changes indicates at least one other item of the plurality of items corresponding to at least one changed channel associated with the selected item,
wherein the at least one other item of the plurality of items corresponding to at least one changed channel is highlighted on the basis of the selected item, and
wherein connection lines which connect the at least one highlighted item and the selected item to each other are displayed.

12. The image display apparatus according to claim 11, wherein the viewing history information for a program or channel includes at least one of:

a viewing time duration for the program or channel,
a number of times the program or channel was viewed during a preset time period, and
a last viewing time for the program or channel.

13. The image display apparatus according to claim 11, wherein the control unit is configured to generate the priority information by determining the priority information for each of the programs based on (a) a viewing time duration, (b) a number of times of viewing, (c) a last viewing time, or any weighted combination of (a), (b) and (c).

14. The image display apparatus according to claim 11, wherein the control unit is configured to visually indicate the plurality of items by:
displaying the plurality of items in different sizes to reflect different priorities of the programs or channels corresponding to the items, or
displaying a different number of a specific mark on each of the plurality of items to reflect different priorities of the programs or channels corresponding to the items, or
displaying the plurality of items overlapped with each other where one of the items having a highest priority is displayed at a forefront or center compared to other items to reflect different priorities of the programs or channels corresponding to the items.

15. The image display apparatus according to claim 11, wherein the plurality of items are arranged on the basis of at least one of a user, a day of the week, a time zone, and a genre.

16. The image display apparatus according to claim 11, wherein the channel change history information for a program or channel includes at least one of:
a time in which signals about a channel change are input;
a channel number of the input time; and
a time section maintained for the channel number, based on a user input.

17. The image display apparatus according to claim 11, wherein each of the plurality of items includes at least one of program information, content provider information, and a representative thumbnail image associated with the program or channel corresponding to that item.

18. The image display apparatus according to claim 17, wherein the control unit is further configured to:
when a user directs a pointer to a specific item among the plurality of items, display at least one of program information, content provider information, and other thumbnail images associated with the program or channel corresponding to the specific item.

19. The image display apparatus according to claim 11, wherein the control unit obtains the viewing history information for each of a plurality of different viewers.

20. The image display apparatus according to claim 11, wherein the control unit is further configured to:
when a specific item among the plurality of items is selected, visually indicate a channel switching pattern associated with the selected specific item.

* * * * *